United States Patent
Mori et al.

(10) Patent No.: US 9,751,526 B2
(45) Date of Patent: Sep. 5, 2017

(54) VEHICLE DRIVE DEVICE AND VEHICLE DRIVE METHOD

(71) Applicants: NISSAN MOTOR CO., LTD., Yokohama-shi, Kanagawa (JP); JATCO Ltd, Fuji-shi, Shizuoka (JP)

(72) Inventors: Kouichi Mori, Ayase (JP); Shigeru Tomoda, Atsugi (JP)

(73) Assignees: NISSAN MOTOR CO., LTD., Yokohama-shi (JP); JATCO LTD, Fuji-shi (JP)

( * ) Notice: Subject to any disclaimer, the term of this patent is extended or adjusted under 35 U.S.C. 154(b) by 307 days.

(21) Appl. No.: 14/409,307

(22) PCT Filed: Apr. 30, 2013

(86) PCT No.: PCT/JP2013/062582
§ 371 (c)(1),
(2) Date: Dec. 18, 2014

(87) PCT Pub. No.: WO2013/190917
PCT Pub. Date: Dec. 27, 2013

(65) Prior Publication Data
US 2015/0148190 A1    May 28, 2015

(30) Foreign Application Priority Data

Jun. 22, 2012 (JP) .................. 2012-140454

(51) Int. Cl.
*B60W 10/08* (2006.01)
*B60W 20/40* (2016.01)
*B60K 6/485* (2007.10)
*B60W 20/00* (2016.01)
*B60W 10/02* (2006.01)

(52) U.S. Cl.
CPC ............. *B60W 20/40* (2013.01); *B60K 6/485* (2013.01); *B60W 10/026* (2013.01); *B60W 10/08* (2013.01); *B60W 20/00* (2013.01); *B60W 2510/0233* (2013.01);
(Continued)

(58) Field of Classification Search
CPC .... B60W 10/026; B60W 10/08; B60W 20/40; B60W 2510/0233; B60K 6/485
See application file for complete search history.

(56) References Cited

U.S. PATENT DOCUMENTS 6,307,277 B1 * 10/2001 Tamai .................. B60K 6/26
                                                              180/65.26
7,953,539 B2    5/2011 Matthews
(Continued)

FOREIGN PATENT DOCUMENTS

CN    101357632 A    2/2009
JP    09-287513 A    11/1997
(Continued)

*Primary Examiner* — Huan Le
(74) *Attorney, Agent, or Firm* — Foley & Lardner LLP (57) ABSTRACT

A torque assist using a motor generator mechanically coupled to an output shaft of an engine via a belt is prohibited during a lock-up transition from a state where a lock-up clutch is released to a state where the lock-up clutch is engaged, and the torque assist using the motor generator is permitted when a condition for the execution of the torque assist is satisfied except during the lock-up transition.

6 Claims, 10 Drawing Sheets

(52) U.S. Cl.
 CPC .... *B60W 2510/244* (2013.01); *Y02T 10/6226* (2013.01); *Y10S 903/902* (2013.01); *Y10T 477/32* (2015.01)

(56) References Cited

U.S. PATENT DOCUMENTS

| | | | |
|---|---|---|---|
| 8,534,399 B2* | 9/2013 | Soliman | B60K 6/48 180/65.21 |
| 2003/0074115 A1 | 4/2003 | Yamaguchi et al. | |
| 2004/0144578 A1 | 7/2004 | Itoh et al. | |
| 2006/0270519 A1* | 11/2006 | Kamada | B60K 6/442 477/3 |
| 2008/0176705 A1 | 7/2008 | Tamai et al. | |
| 2008/0249695 A1 | 10/2008 | Matthews | |
| 2012/0323425 A1* | 12/2012 | Suyama | B60K 6/387 701/22 |

FOREIGN PATENT DOCUMENTS

| | | |
|---|---|---|
| JP | 11-027806 A | 1/1999 |
| JP | 2000-287306 A | 10/2000 |
| JP | 2002-118901 A | 4/2002 |
| JP | 2003-118434 A | 4/2003 |
| JP | 2004-229372 A | 8/2004 |
| JP | 2007-292079 A | 11/2007 |
| JP | 2011-127570 A | 6/2011 |

* cited by examiner

VEHICLE DRIVE DEVICE AND VEHICLE DRIVE METHOD

TECHNICAL FIELD

The prevent invention relates to a vehicle drive device and a vehicle drive method.

BACKGROUND ART

A technology for mechanically coupling a motor generator to an output shaft of an engine via a belt and starting the engine by this motor generator is known (JP2007-292079A).

SUMMARY OF INVENTION

The present inventors conceived that drivability would be improved if a use range of the motor generator was not limited to a range for starting the engine, but extended to a range for torque assist during the travel of a vehicle.

However, only a case where the motor generator is used to start the engine is considered in the technology of the above patent literature 1 and there is no disclosure on a design and a control method for the motor generator in the case of extension to a torque assist during the travel of the vehicle.

The present invention aims to provide a technology for improving drivability by extending the use of a motor generator mechanically coupled to an output shaft of an engine via a belt to a torque assist during the travel of a vehicle.

A vehicle drive device in one embodiment prohibits a torque assist using a motor generator mechanically coupled to an output shaft of an engine via a belt during a lock-up transition from a state where a lock-up clutch is released to a state where the lock-up clutch is engaged, and permits the torque assist using the motor generator when a condition for the execution of the torque assist is satisfied except during the lock-up transition.

Embodiments and advantages of the present invention are described in detail below along with the accompanying drawings.

DESCRIPTION OF EMBODIMENTS

First Embodiment

Figure 1:
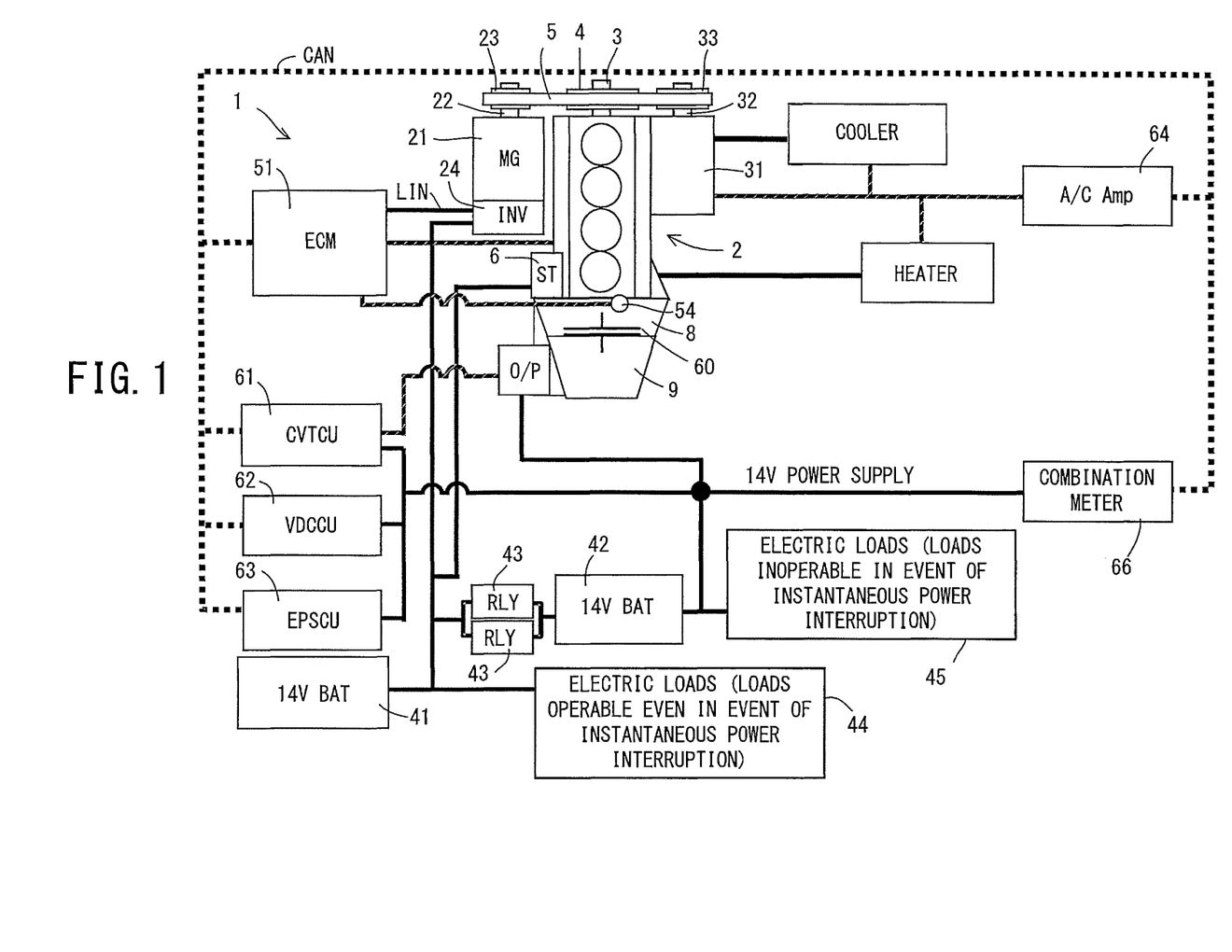
FIG. 1 is a schematic configuration diagram of a vehicle drive device in a first embodiment.

FIG. 1 is a schematic configuration diagram of a vehicle drive device in a first embodiment. In FIG. 1, a vehicle 1 includes an engine 2, a motor generator 21 and a compressor for air conditioner 31. Specifically, an output shaft 3 of the engine 2, a rotary shaft 22 of the motor generator 21 and a rotary shaft 32 of the compressor for air conditioner 31 are arranged in parallel, a crank pulley 4 is mounted on one end of the output shaft 3 and pulleys 23, 33 are respectively mounted on the rotary shaft 22, 32. A belt 5 is mounted on these three pulleys 4, 23 and 33, and power is transmitted (transferred) among the output shaft 3 of the engine 2 and the rotary shaft 23, 33 by the belt 5.

A starter 6 is used to start the engine 2. A torque converter 8 and a V-belt automatic transmission 9 are connected to the other end of the output shaft 3 of the engine 2. The torque converter 8 includes unillustrated pump impeller and turbine runner. The V-belt automatic transmission 9 includes unillustrated primary pulley, secondary pulley and a steel belt mounted on these pulleys. A rotational drive force of the engine 2 is finally transmitted to vehicle drive wheels (not shown) via these torque converter 8 and automatic transmission 9.

A main battery 41 and an auxiliary battery 42 are provided as power supplies of the vehicle 1. Both are 14V batteries. The two batteries 41, 42 are connected by two relays 43 arranged in parallel.

The starter 6 and the motor generator 21 described above are connected between the main battery 41 and the relay 43 and power is supplied thereto from the main battery 41. It should be noted that since the motor generator 21 is composed of an AC machine, an inverter 24 for converting a direct current from the main battery 41 into an alternating current is attached.

An engine control module (ECM) 51 controls the engine 2, the starter 6 and the motor generator 21.

Figure 2:
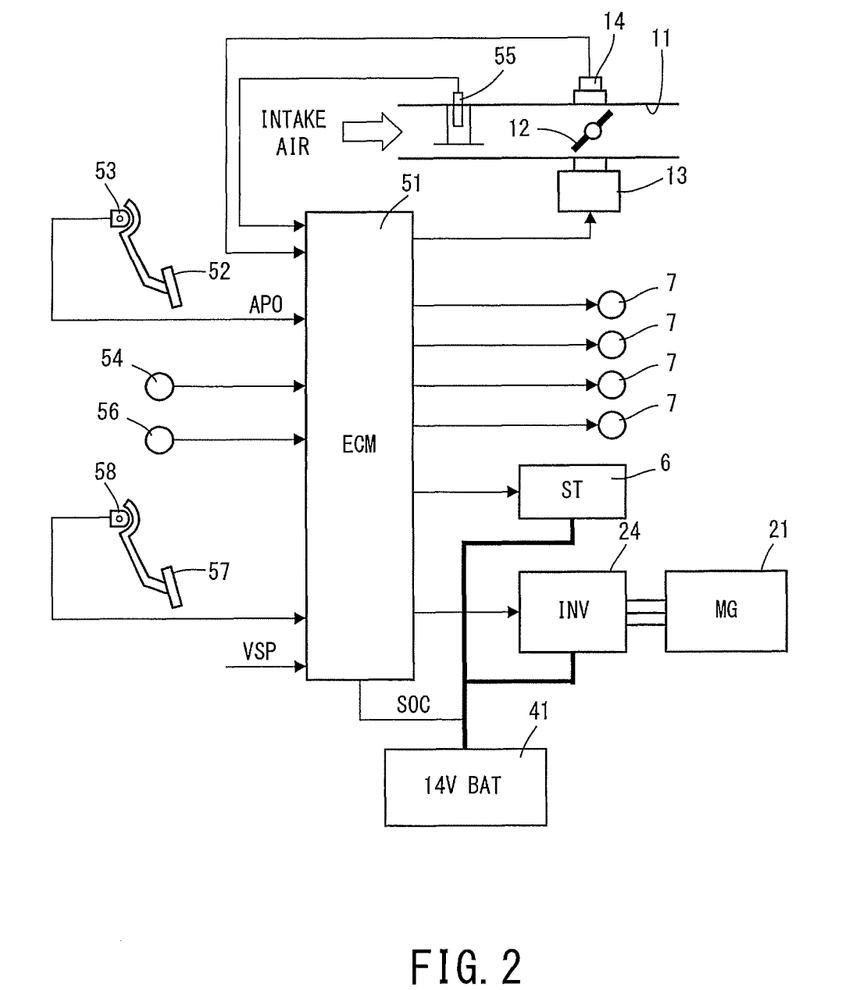
FIG. 2 is a control system diagram of a gasoline engine.

FIG. 2 is a control system diagram of a gasoline engine. A fuel injection valve 7 is provided in each intake port (not shown). The fuel injection valve 7 intermittently supplies fuel to the engine 2.

An electronically controlled throttle valve 12 is provided in an intake passage 11, and an opening of the throttle valve 12 (hereinafter, referred to as a "throttle opening") is controlled by a throttle motor 13. An actual throttle opening is detected by a throttle sensor 14 and input to the engine control module 51.

A signal indicating an accelerator pedal opening (depressed amount of an accelerator pedal 52) from an accelerator sensor 53, a signal indicating a crank angle from a crank angle sensor 54 and a signal indicating an intake air amount from an air flow meter 55 are input to the engine control module 51. A rotation speed of the engine 2 is calculated from the signal of the crank angle sensor 54. The engine control module 51 calculates a target intake air amount and a target fuel injection amount based on these signals and issues commands to the throttle motor 13 and each fuel injection valve 7 to achieve the target intake air amount and the target fuel injection amount.

Here, a control of the intake air amount is outlined (see JP 09-287513A). By searching a predetermined map based on an accelerator pedal opening APO and an engine rotation speed Ne, a target basic intake air amount and a target equivalence ratio tDML are respectively calculated. A value obtained by dividing the target basic intake air amount by the target equivalence ratio tDML is set as the target intake air amount. By searching a predetermined map based on this target intake air amount and the engine rotation speed, a target throttle valve opening is obtained. The target throttle valve opening is converted into a command value, which is output to the throttle motor 13.

Next, a control of fuel injection (fuel injection amount and fuel injection timing) is outlined. An output of the air flow meter 55 is A/D converted and linearized to calculate an intake air amount Qa. A basic injection pulse width Tp0 [ms] at which an air-fuel mixture of a substantially theoretical air fuel ratio (equivalence ratio=1.0) is calculated by Tp0=K×Qa/Ne (where K is a constant) from the intake air amount Qa and the engine rotation speed Ne. Subsequently, a cylinder air amount equivalent pulse width Tp [ms] is calculated by the following equation:

$$Tp=Tp0 \times F\text{load} + Tp-1 \times (1-F\text{load})$$

where Fload: weighted average coefficient, and
Tp−1: Tp last time.

The amount of air flowing into a cylinder (combustion chamber) (i.e. cylinder air amount) has a response delay with respect to the intake air amount in an air flow meter part. This response delay is approximated by a primary delay in this way. The weighted average coefficient Fload [absolute number] which is a coefficient of the primary delay can be obtained by searching a predetermined map based on a product Ne·V of the rotation speed Ne and a cylinder volume V and a total flow passage area Aa of an intake passage. Based on the cylinder air amount equivalent pulse width Tp obtained in this way, a fuel injection pulse width Ti [ms] to be given to the fuel injection valves 7 is calculated by the following equation:

$$Ti=Tp \times tDML \times (\alpha+\alpha m-1) \times 2+Ts$$

where tDML: target equivalence ratio [absolute number]
α: air fuel ratio feedback correction coefficient [absolute number]
αm: air fuel ratio learning value [absolute number]
Ts: invalid injection pulse width [absolute number].

When a predetermined fuel injection timing is reached, the fuel injections valve 7 are opened for a period of this fuel injection pulse width Ti.

It should be noted that the gasoline engine 2 includes ignition plugs facing combustion chambers (cylinders). The engine control module 51 causes an ignition plug to generate a spark by cutting off a primary side current of an ignition coil at a predetermined timing before a compression top dead center, thereby igniting the air-fuel mixture in the combustion chamber.

Further, the engine control module 51 drives the starter 6 to start the engine 2 when determining based on a signal from the starter switch 56 that a first start request has been made.

The engine control module 51 executes an idle stop control for the purpose of improving fuel economy. Specifically, an idle stop permission condition is satisfied when the accelerator pedal 52 is not depressed (APO=0), a brake pedal 57 is depressed (brake switch 58 is on) and the vehicle 1 is in a stopped state (vehicle speed VSP=0). When the idle stop permission condition is satisfied, fuel injection from the fuel injection valves 7 to the intake ports is shut off to stop the engine 2. In this way, unnecessary fuel consumption is reduced.

Thereafter, the idle stop permission condition is no longer satisfied such as when the accelerator pedal 52 is depressed or the brake pedal 57 is released (brake switch 58 is off) in an idle stop state. When the idle stop permission condition is no longer satisfied, the engine 2 is cranked using the motor generator 21 as a starter and fuel injection from the fuel injection valves 7 and spark ignition by the ignition plugs are resumed to restart the engine 2.

By exclusively using the motor generator 21 for engine restart from the idle stop state in this way, the use frequency of the starter 6 is reduced to protect the starter 6. It should be noted that when the starter 6 or the motor generator 21 is driven, the two relays 43 are both cut off to electrically separate the main battery 41 and the auxiliary battery 42 by the engine control module 51. In this way, a voltage variation of the auxiliary battery 42 in association with a starting operation of the engine 2 is prevented.

Description is continued with reference back to FIG. 1. The vehicle 1 includes a control unit for automatic transmission (CVTCU) 61. The control unit for automatic transmission 61 continuously controls a speed ratio of the automatic transmission 9 according to a vehicle travel condition determined from the vehicle speed and the throttle opening. Further, the torque converter 8 including the pump impeller and the turbine runner is provided with a mechanical lock-up clutch 60 for engaging/releasing the pump impeller and the turbine runner. A vehicle travel region in which the lock-up clutch 60 is engaged is determined as a lock-up region (using the vehicle speed and the throttle opening as parameters) in advance. The control unit for automatic transmission 61 engages the lock-up clutch 60 to directly couple the engine 2 and the transmission 9 when the vehicle travel condition is in the lock-up region while releasing the lock-up clutch 60 when the vehicle travel condition is not in the lock-up region. When the engine 2 and the transmission 9 are directly coupled, a torque is no longer absorbed in the torque converter 8 and fuel economy is improved by that much. The control unit for automatic transmission 61 sends to the engine control module 51 a signal indicating a lock-up state, specifically a signal indicating the completion of lock-up, a signal indicating a non-lock-up state and a signal indicating that a lock-up transition from a state where the lock-up clutch 60 is released to a state where the lock-up clutch 60 is engaged is in process.

The vehicle 1 also includes a vehicle dynamic control unit (VDCCU) 62, a control unit for vehicle speed sensitive electric power steering (EPSCU) 63, an auto amplifier for air conditioner 64 and a combination meter 66. The vehicle dynamic control unit 62 is so configured that a skid state is detected by a sensor when the vehicle is about to skid or swerve and vehicle stability during travel is improved by a brake control and an engine output control. The control unit for vehicle speed sensitive electric power steering 63 outputs an optimal assist torque signal to an EPS motor based on a steering torque input from a torque sensor and the vehicle speed.

The control unit for automatic transmission 61, the vehicle dynamic control unit 62 and the control unit for vehicle speed sensitive power steering 63 and the combination meter 66 are electric loads which cannot allow a voltage drop. Thus, these receive the supply of power from the auxiliary battery 42.

The engine control module 51, the three control units 61 to 63 and the auto amplifier for air conditioner (A/C Amp) 64 and the combination meter 66 are connected by a CAN (Controller Area Network). A vehicle speed signal is input to the engine control module 51 from the combination meter 66.

As described above, the present inventors thought of that drivability would be improved if the use range of the motor generator 21 could be extended to the range for torque assist during the travel of the vehicle instead of being limited only the range for starting the engine.

Accordingly, in the first embodiment, the use range of the motor generator 21 used for restart from the idle stop state is extended to the torque assist during the travel of the vehicle. Specifically, the torque assist using the motor generator 21 is permitted except during the lock-up transition from the state where the lock-up clutch 60 of the torque converter 8 is released to the state where the lock-up clutch 60 is engaged. In other words, the torque assist using the motor generator 21 is prohibited during the lock-up transition.

When the torque assist is permitted, the motor generator 21 is caused to generate a predetermined assist torque using the main battery 41 as a power supply to torque assist the engine 2. When the torque assist is prohibited, no assist torque is generated. In this way, good acceleration responsiveness (drivability) is obtained after the start of the engine 2 and after the start of the travel of the vehicle 1.

A voltage of the main battery 41 is monitored and input to the engine control module 51. The engine control module 51 calculates an SOC (State of Charge) of the main battery 41 and manages the balance of charge and discharge of the main battery 41.

The inverter 24 and the engine control module 51 are connected by a LIN (Local Interconnect Network). The engine control module 51 commands to the inverter 24 as to whether or not to drive the motor generator 21, whether or not to generate power by the motor generator 21, how much current is to be flowed to drive the motor generator 21 as a motor and the like.

Figure 3:
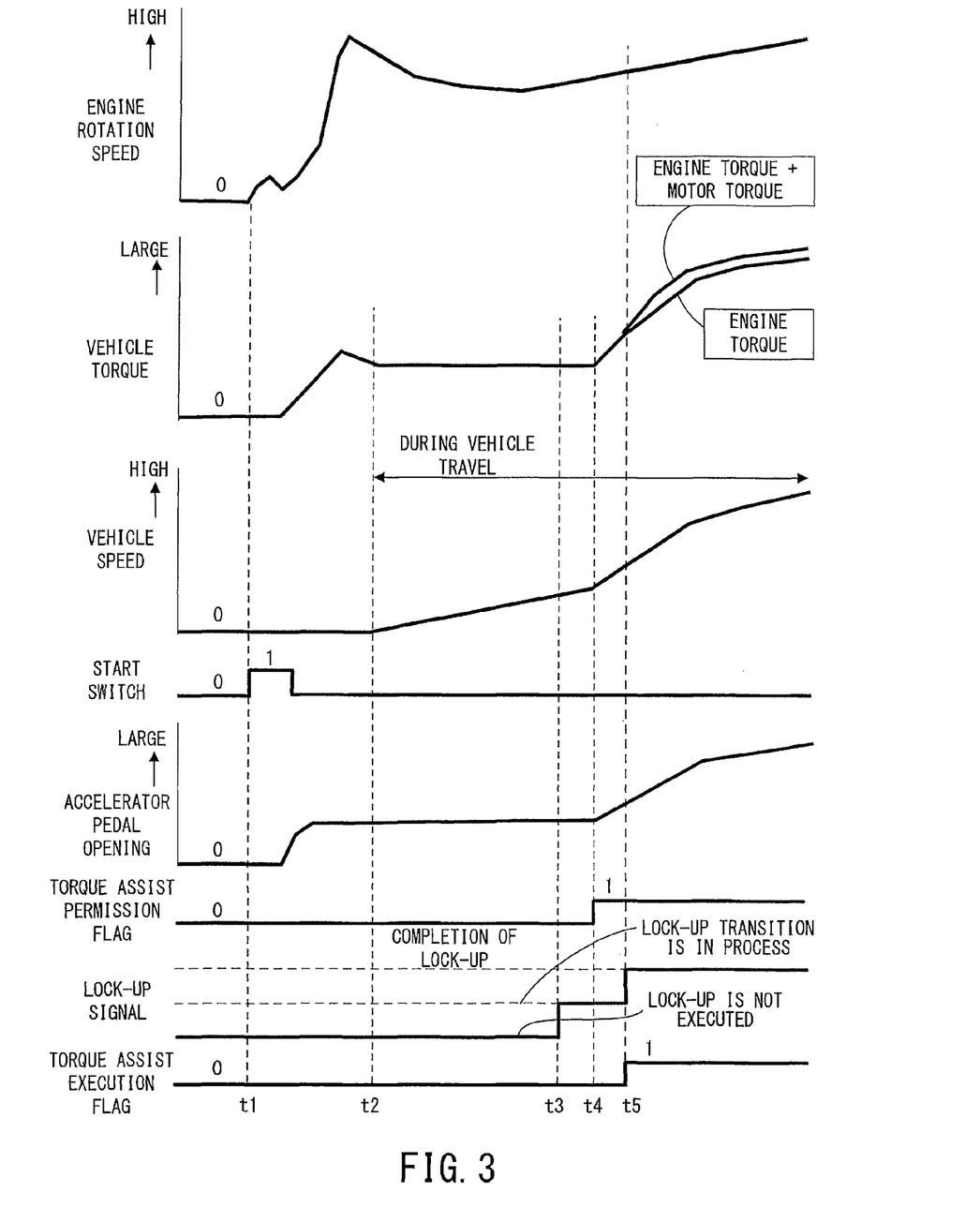
FIG. 3 is timing charts showing how an engine rotation speed, a vehicle torque, a vehicle speed and an accelerator pedal opening change from the start of the engine in the first embodiment by models.

The torque assist executed using the motor generator 21 except during the lock-up transition from the state where the lock-up clutch 60 is released to the state where the lock-up clutch 60 is engaged after the start of the engine 2 and after the start of the travel of the vehicle 1 is described with reference to FIG. 3. FIG. 3 is timing charts showing how the engine rotation speed, a vehicle torque, the vehicle speed and the accelerator pedal opening change from the start of the engine by models. Here, the "vehicle torque" means a torque used to drive the vehicle. Normally, an engine torque is the vehicle torque. On the other hand, when the torque assist by the motor generator 21 is executed, the sum of this assist torque and the engine torque is the vehicle torque. Flags and signals shown in a lower part of FIG. 3 are described later.

When the starter switch 56 is turned on at timing t1, the engine 2 is cranked using the starter 6 and fuel injection from the fuel injection valves 7 and spark ignition by the ignition plugs are performed. When the engine 2 starts combustion in this way, the engine rotation speed rapidly increases.

Thereafter, when a driver depresses the accelerator pedal 52, the vehicle starts traveling at timing t2 and the vehicle speed slowly increases.

When the vehicle travel condition enters the lock-up region at timing t3, the engagement of the lock-up clutch 60 is started. Specifically, a signal input from the control unit for automatic transmission 61 is switched from a signal indicating the non-lock-up state to a signal indicating that the lock-up transition is in process.

Thereafter, a torque assist permission condition is satisfied at timing t4. For example, it is determined that the torque assist permission condition is not satisfied when the SOC of the main battery 41 is below a torque assist permission value, whereas it is determined that the torque assist permission condition is satisfied when the SOC of the main battery 41 is not below the torque assist permission value. However, the torque assist permission condition is not limited to the aforementioned condition.

As described above, in the vehicle drive device in the present embodiment, the torque assist using the motor generator 21 is prohibited during the lock-up transition from the state where the lock-up clutch 60 is released to the state where the lock-up clutch 60 is engaged. Accordingly, although the torque assist permission condition is satisfied at timing t4, the torque assist using the motor generator 21 is not executed since the lock-up transition is in process.

Thereafter, the engagement of the lock-up clutch 60 is completed at timing t5. Specifically, the signal input from the control unit for automatic transmission 61 is switched from the signal indicating that the lock-up transition is in process to the signal indicating the completion of the lock-up. Since a condition for the execution of the torque assist is satisfied in this way, a torque assist execution flag is changed from 0 to 1 and a current is caused to flow into the inverter 24 from the main battery 42 and the motor generator 21 is driven as a motor. In this way, a motor torque is added to an engine torque (torque assist) and acceleration desired by the driver is immediately obtained. In this case, a torque generated by the motor generator 21 gradually increases from zero to reach a maximum torque (see second row of FIG. 3).

Here, if it is attempted to cover the torque assist by the motor generator 21 with the torque generated by the engine 2, fuel supply from the fuel injection valves 7 has to be corrected to increase, whereby fuel consumption increases and fuel economy is deteriorated by that much. Contrary to this, kinetic energy is recovered as electric energy by the motor generator 21 and the recovered electric energy is stored in the main battery 41 during the deceleration of the vehicle 1. If the assist torque is generated by the motor generator 21 using the main battery 41 storing this electric energy as a power supply when the torque assist permission condition is satisfied and the lock-up transition is not in process, fuel is not consumed. Thus, fuel economy is not deteriorated. Further, the motor generator 21 can generate a torque with better responsiveness than the engine 2. If responsiveness is good, it can be avoided that the driver excessively depresses the accelerator pedal.

Figure 4:
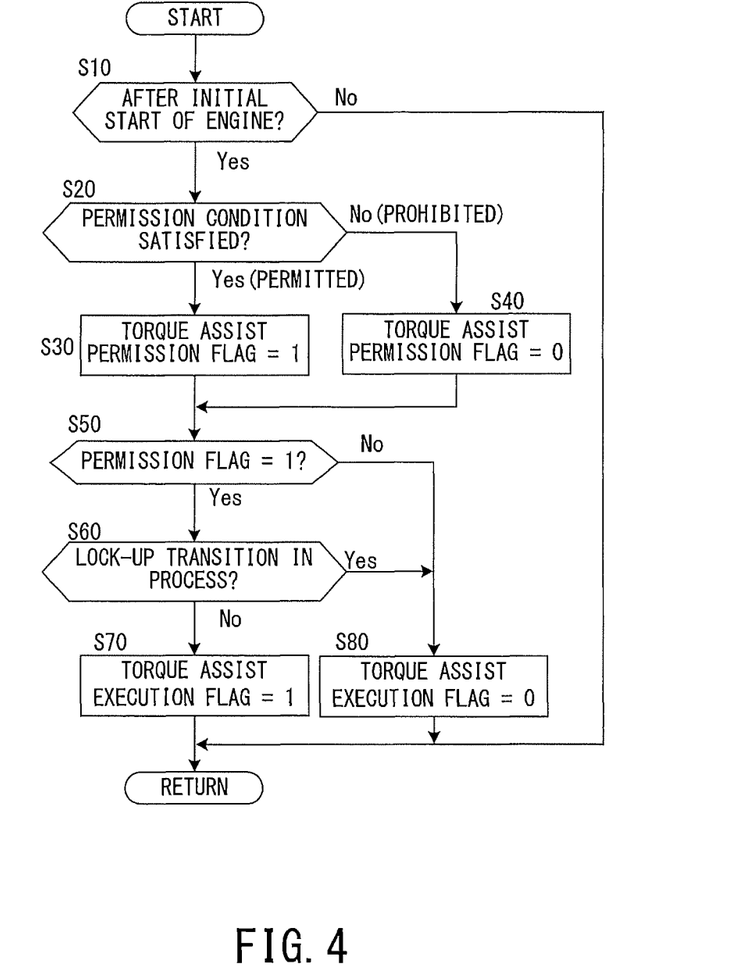
FIG. 4 is a flow chart of a torque assist control using a motor generator.

FIG. 4 is a flow chart of a torque assist control using the motor generator 21. A process of the flow chart shown in FIG. 4 is performed at regular time intervals (e.g. every 10 ms) by the engine control module 51 after an unillustrated ignition switch is turned on.

In Step S10, it is determined whether or not an initial start of the engine 2 has been made. At the initial start of the engine 2, the starter 6 is used. The process this time is finished unless it is determined that the initial start of the engine 2 has been made, whereas an advance is made to Step S20 if it is determined that the initial start of the engine 2 has been made.

In Step S20, it is determined whether or not the torque assist permission condition is satisfied. An advance is made to Step S30 to set the torque assist permission flag to 1 if it is determined that the torque assist permission condition is satisfied. On the other hand, an advance is made to Step S40 to set the torque assist permission flag to 0 unless it is determined that the torque assist permission condition is satisfied.

In Step S50, it is determined whether or not the torque assist permission flag is 1. An advance is made to Step S60 if the torque assist permission flag is determined to be 1, whereas an advance is made to step S80 if the torque assist permission flag is determined to be 0.

In Step S60, it is determined based on a signal input from the control unit for automatic transmission 61 whether or not the lock-up transition is in process. An advance is made to Step S70 and the torque assist execution flag is set to 1 to execute the torque assist unless it is determined that the lock-up transition is in process.

By setting the torque assist execution flag to 1, the engine control module 51 causes a current to flow into the inverter 24 to drive the motor generator 21 as a motor. This is shown in FIG. 3 by a switch of the torque assist execution flag from 0 to 1 at timing t5 and the addition of the motor torque to the engine torque at timing t5.

On the other hand, if it is determined in Step S60 that the lock-up transition is in process, an advance is made to Step S80 to set the torque assist execution flag to 0. By setting the torque assist execution flag to 0, the engine control module 51 cuts off the supply of the current to the inverter 24 to set the motor generator 21 in a non-drive state. Specifically, since the torque assist by the motor generator 21 is prohibited during the lock-up transition, facing burn of the lock-up clutch 60 and a reduction in judder life caused by executing the torque assist during the lock-up transition can be prevented. Further, it is possible to prevent the deterioration of drivability caused by executing the torque assist when an unstable torque is transmitted during the lock-up transition.

Although an example of causing the motor generator 21 to generate the torque up to the maximum torque has been described in the present embodiment, there is no limitation to this. For example, a constant torque below the maximum torque may be generated.

As described above, according to the vehicle drive device in the first embodiment, the torque assist using the motor generator 21 mechanically coupled to the output shaft of the engine 2 via the belt is prohibited during the lock-up transition from the state where the lock-up clutch 60 is released to the state where the lock-up transition 60 is engaged. If the condition for the execution of the torque assist is satisfied except during the lock-up transition, the torque assist using the motor generator 21 is permitted. In this way, facing burn of the lock-up clutch 60 and a reduction in judder life caused by executing the torque assist during the lock-up transition can be prevented. Further, it is possible to prevent the deterioration of drivability caused by executing the torque assist when an unstable torque is transmitted during the lock-up transition.

Second Embodiment

In a vehicle drive device in a second embodiment, the torque assist using the motor generator 21 is executed when the torque assist execution condition is satisfied and the lock-up clutch 60 is engaged.

Figure 5:
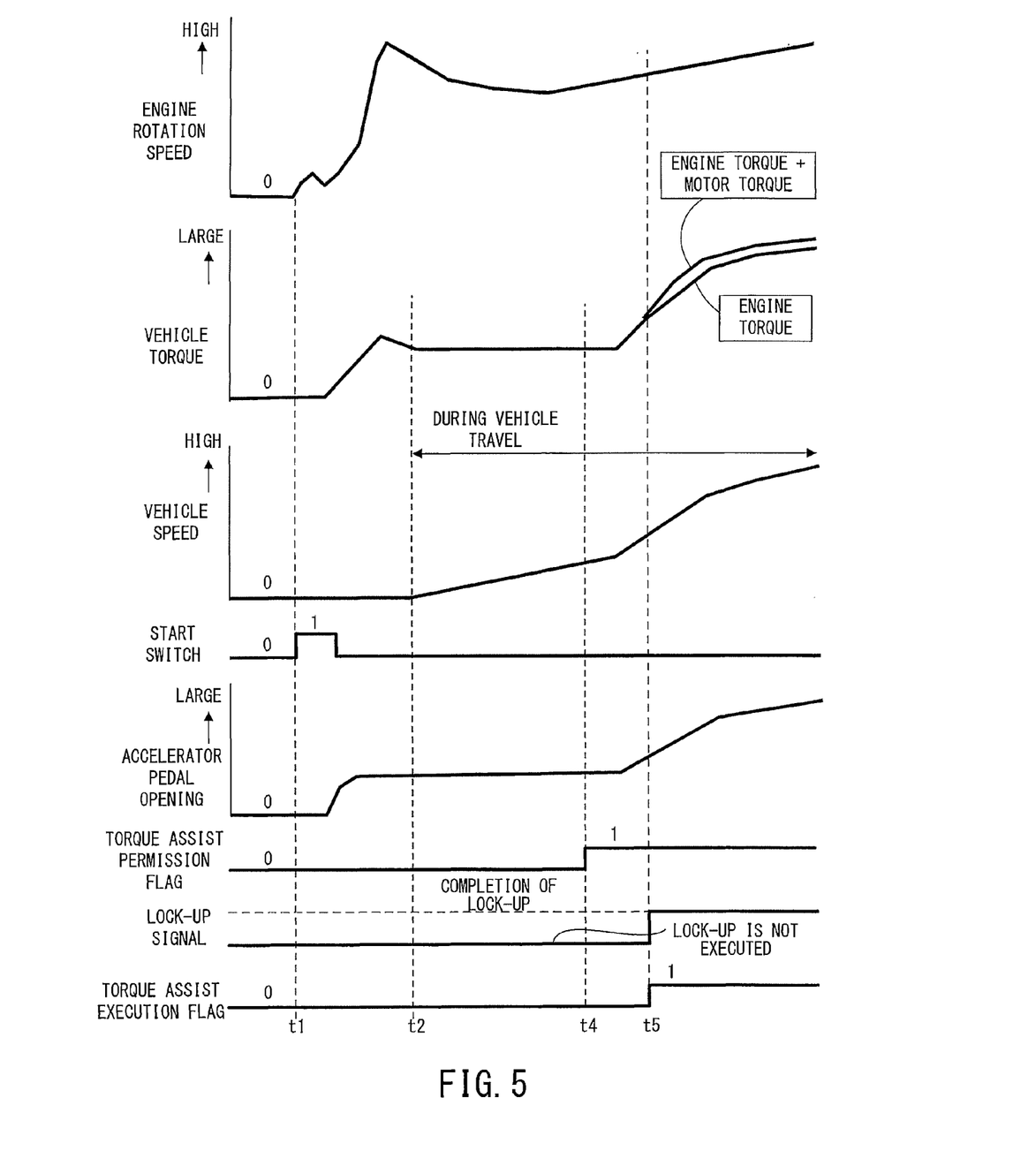
FIG. 5 is timing charts showing how an engine rotation speed, a vehicle torque, a vehicle speed and an accelerator pedal opening change from the start of an engine in a second embodiment by models.

FIG. 5 is timing charts showing how the engine rotation speed, the vehicle torque, the vehicle speed and the accelerator pedal opening change from the start of the engine in the second embodiment by models and corresponds to timing charts of FIG. 3.

In the timing charts of FIG. 5, the torque assist permission condition is satisfied and the torque assist permission flag changes from 0 to 1 at timing t4. Thereafter, a current from the main battery 41 is caused to flow into the inverter 24 and the motor generator 21 is caused to generate a motor torque by engaging the lock-up clutch 60 at timing t5. In this way, the motor torque is added to an engine torque (torque assist) and acceleration desired by the driver is immediately obtained.

Figure 6:
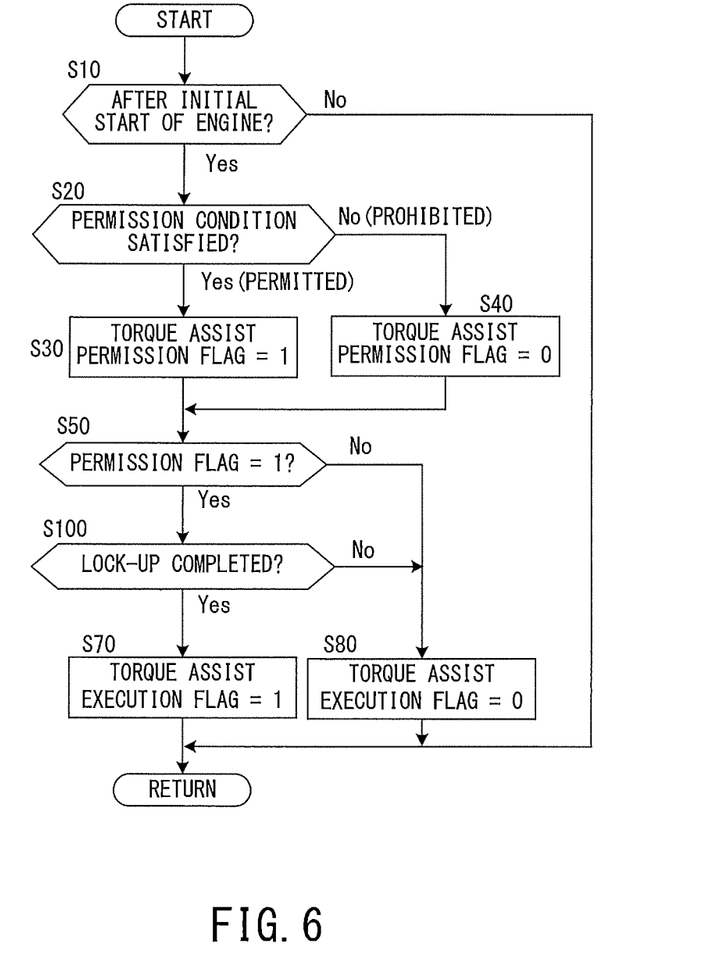
FIG. 6 is a flow chart of a torque assist control using a motor generator executed by a vehicle drive device in the second embodiment.

FIG. 6 is a flow chart of a torque assist control using the motor generator 21 executed by the vehicle drive device in the second embodiment. Steps in which the same processing as that of the flow chart shown in FIG. 4 is performed are denoted by the same reference signals and not described in detail.

In Step S100 following after the torque assist execution flag is determined to be 1 in Step S50, it is determined whether or not the lock-up clutch 60 is engaged, i.e. whether or not a signal indicating the completion of the lock-up is input from the control unit for automatic transmission 61. An advance is made to Step S70 to set the torque assist execution flag to 1 if it is determined that the signal indicating the completion of the lock-up is input. By setting the torque assist execution flag to 1, the engine control module 51 causes a current to flow into the inverter 24 and drives the motor generator 21 as a motor.

On the other hand, unless it is determined in Step S100 that the signal indicating the completion of the lock-up is input, an advance is made to Step S80 to set the torque assist execution flag to 0.

As described above, according to the vehicle drive device in the second embodiment, the torque assist using the motor generator 21 is prohibited in the state where the lock-up clutch 60 is released, and permitted when the lock-up clutch 60 is engaged and the condition for the execution of the torque assist is satisfied. Even if the torque assist using the motor generator 21 is executed in the state where the lock-up clutch 60 is released, an assist torque is converted into heat in the torque converter 8. However, by prohibiting the torque assist using the motor generator 21 in the state where the lock-up clutch 60 is released, it is possible to prevent the assist torque from being converted into heat in the torque converter 8 and improve fuel economy (electric mileage). Further, by executing the torque assist in the state where the lock-up clutch 60 is engaged, a drive torque of the motor generator 21 can be efficiently utilized and fuel economy of the vehicle can be improved.

Third Embodiment

In a vehicle drive device in a third embodiment, the torque assist using the motor generator 21 is executed after the elapse of a predetermined time after the torque assist permission condition is satisfied and the lock-up clutch 60 is engaged.

Figure 7:
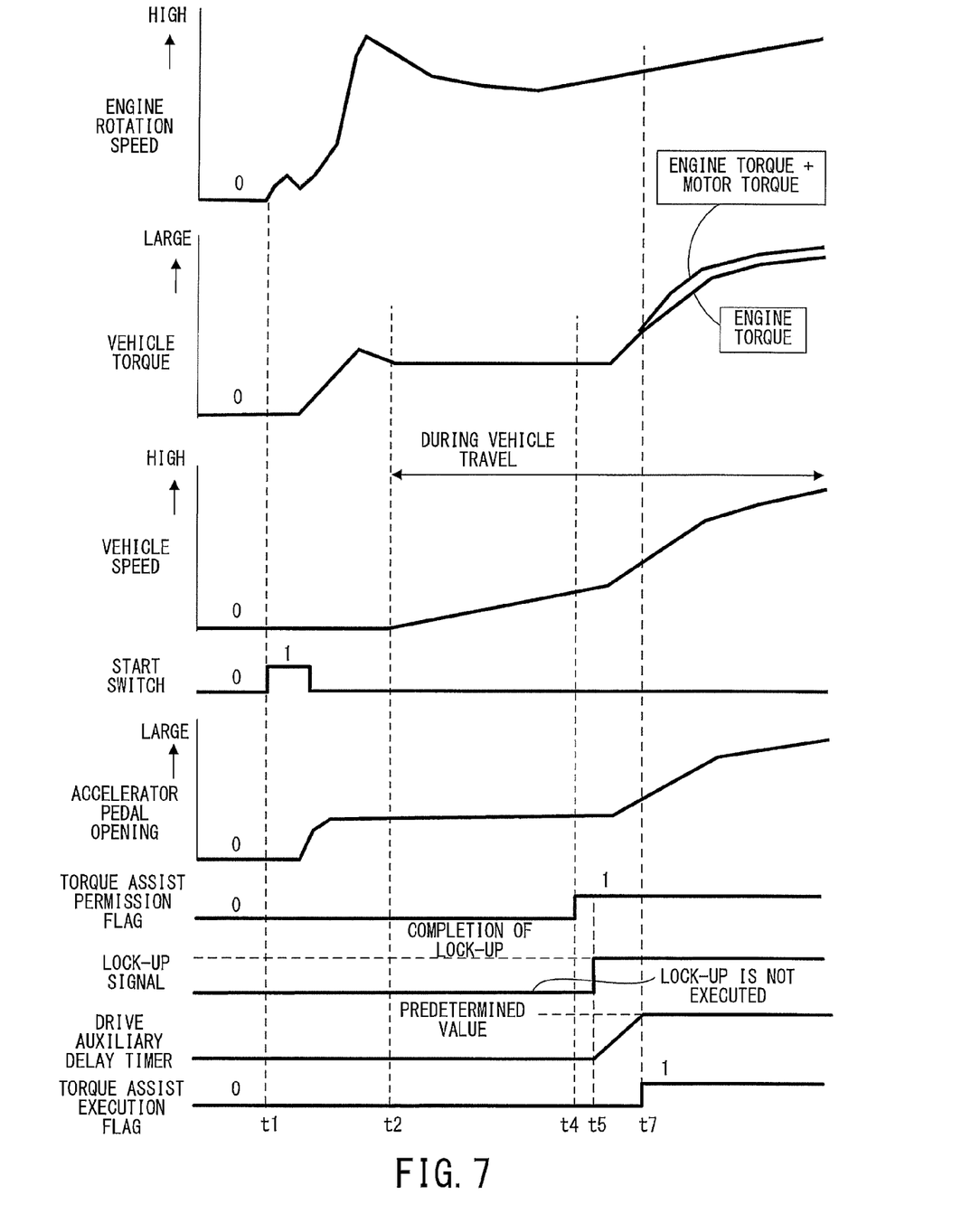
FIG. 7 is timing charts showing how an engine rotation speed, a vehicle torque, a vehicle speed and an accelerator pedal opening change from the start of an engine in a third embodiment by models.

FIG. 7 is timing charts showing how the engine rotation speed, the vehicle torque, the vehicle speed and the accelerator pedal opening change from the start of the engine in the third embodiment by models and corresponds to timing charts of FIG. 3.

The torque assist permission condition is satisfied and the torque assist permission flag changes from 0 to 1 at timing t4 and, then, the lock-up clutch 60 is engaged at timing t5. The count-up of a delay timer is started at timing t5 at which the lock-up clutch 60 is engaged, and a current from the main battery 41 is caused to flow into the inverter 24 and the motor generator 21 is caused to generate a motor torque at timing t7 at which a count value by the delay timer becomes a predetermined value or larger (elapse of a predetermined time). In this way, the motor torque is added to an engine torque (torque assist) and acceleration desired by the driver is immediately obtained.

Figure 8:
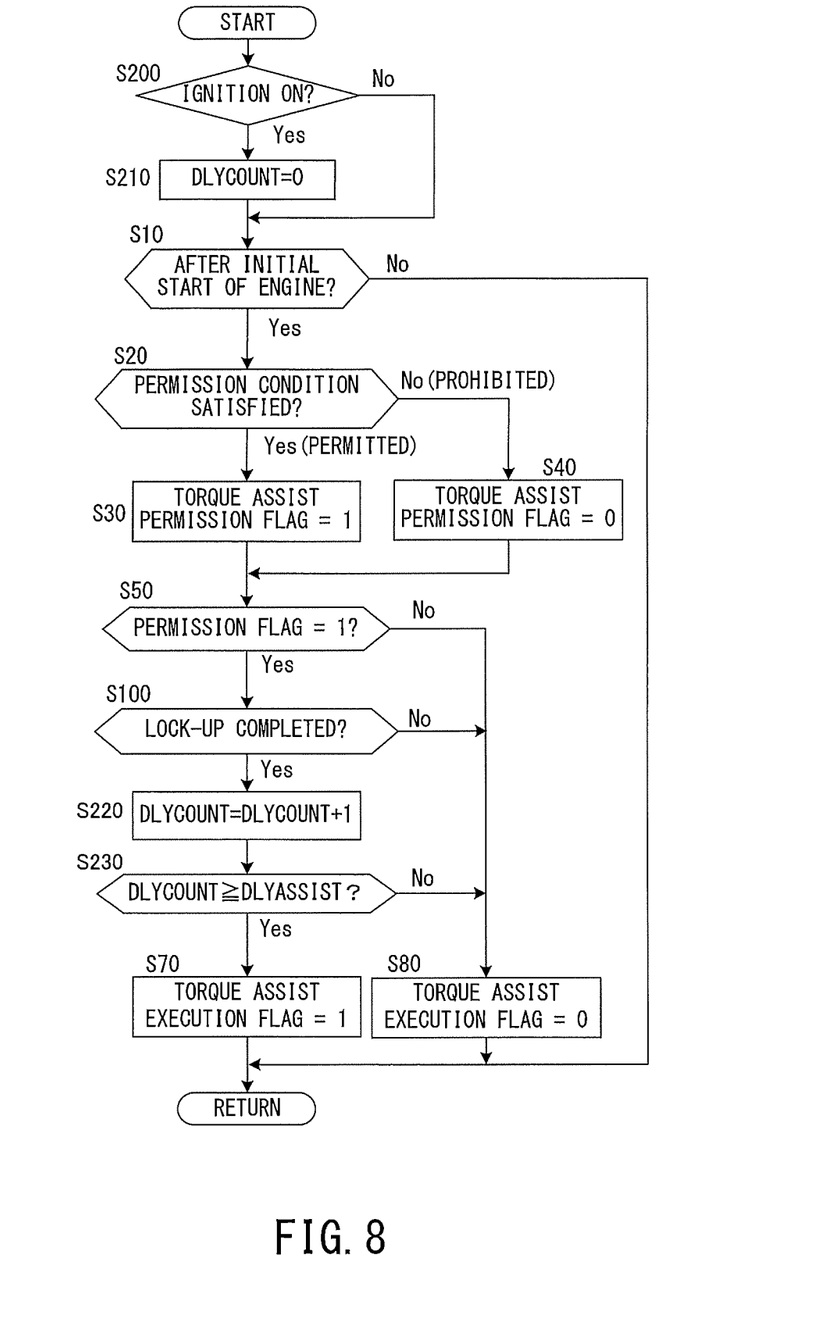
FIG. 8 is a flow chart of a torque assist control using a motor generator executed by a vehicle drive device in the third embodiment.

FIG. 8 is a flow chart of a torque assist control using the motor generator 21 executed by the vehicle drive device in the third embodiment. Steps in which the same processing as that of the flow charts shown in FIGS. 4 and 6 is performed are denoted by the same reference signals and not described in detail.

In Step S200, it is determined whether or not the unillustrated ignition switch has been turned on from off. An advance is made to Step S210 if it is determined that the ignition switch has been turned on from off, whereas an advance is made to Step S10 in the second or subsequent process once the ignition switch is turned on.

In Step S210, a count value DLYCOUNT of the delay timer is reset to 0.

An advance is made to Step S220 if it is determined in Step S100 that the signal indicating the completion of the lock-up is input. In Step S220, the count-up of the delay timer is started. Specifically, 1 is added to the count value DLYCOUNT. It should be noted that the delay timer is provided in the engine control module 51.

In Step S230, it is determined whether or not the count value DLYCOUNT by the delay timer is a predetermined value DLYASSIST or larger. If the count value DLYCOUNT of the delay timer is determined to be a predetermined value DLYASSIST or larger, an advance is made to Step S70 to set the torque assist execution flag to 1. If the count value DLYCOUNT of the delay timer is determined to be below the predetermined value DLYASSIST, an advance is made to Step S80 to set the torque assist execution flag to 0. An instruction to increase a CVT hydraulic pressure of the automatic transmission 9 is issued to increase the CVT hydraulic pressure in preparation for the execution of the torque assist using the motor generator 21 while the count value DLYCOUNT is determined to be below the predetermined value DLYASSIST.

It should be noted that the process of the flow chart shown in FIG. 8 is performed at regular time intervals (e.g. every 10 ms). Considering also an actual processing time, a numerical value 1 of the count value DLYCOUNT by the delay timer may not match an actual elapsed time (e.g. 1 sec). In the present embodiment, since the torque assist using the motor generator 21 is executed after the elapse of the predetermined time after the torque assist permission condition is satisfied and the lock-up clutch is engaged, the predetermined value DLYASSIST to be compared with the count value DLYCOUNT is set to execute the torque assist after the elapse of the predetermined time after the lock-up clutch is engaged.

As described above, according to the vehicle drive device in the third embodiment, the torque assist using the motor generator 21 is permitted after the elapse of the predetermined time after the lock-up clutch 60 is engaged in the state where the torque assist permission condition is satisfied. In this way, since the torque assist can be executed after the CVT hydraulic pressure with slower responsiveness than the motor starting torque is increased on ahead, belt slippage of the CVT (automatic transmission 9) can be reliably suppressed at the time of the torque assist. Further, fuel economy (electric mileage) can be improved since a loss of energy converted into heat due to belt slippage in addition to that in the torque converter 8 is reduced.

Fourth Embodiment

In a vehicle drive device in a fourth embodiment, the torque assist using the motor generator 21 is executed after the elapse of a predetermined time after the lock-up clutch 60 is engaged and the torque assist permission condition is satisfied.

Figure 9:
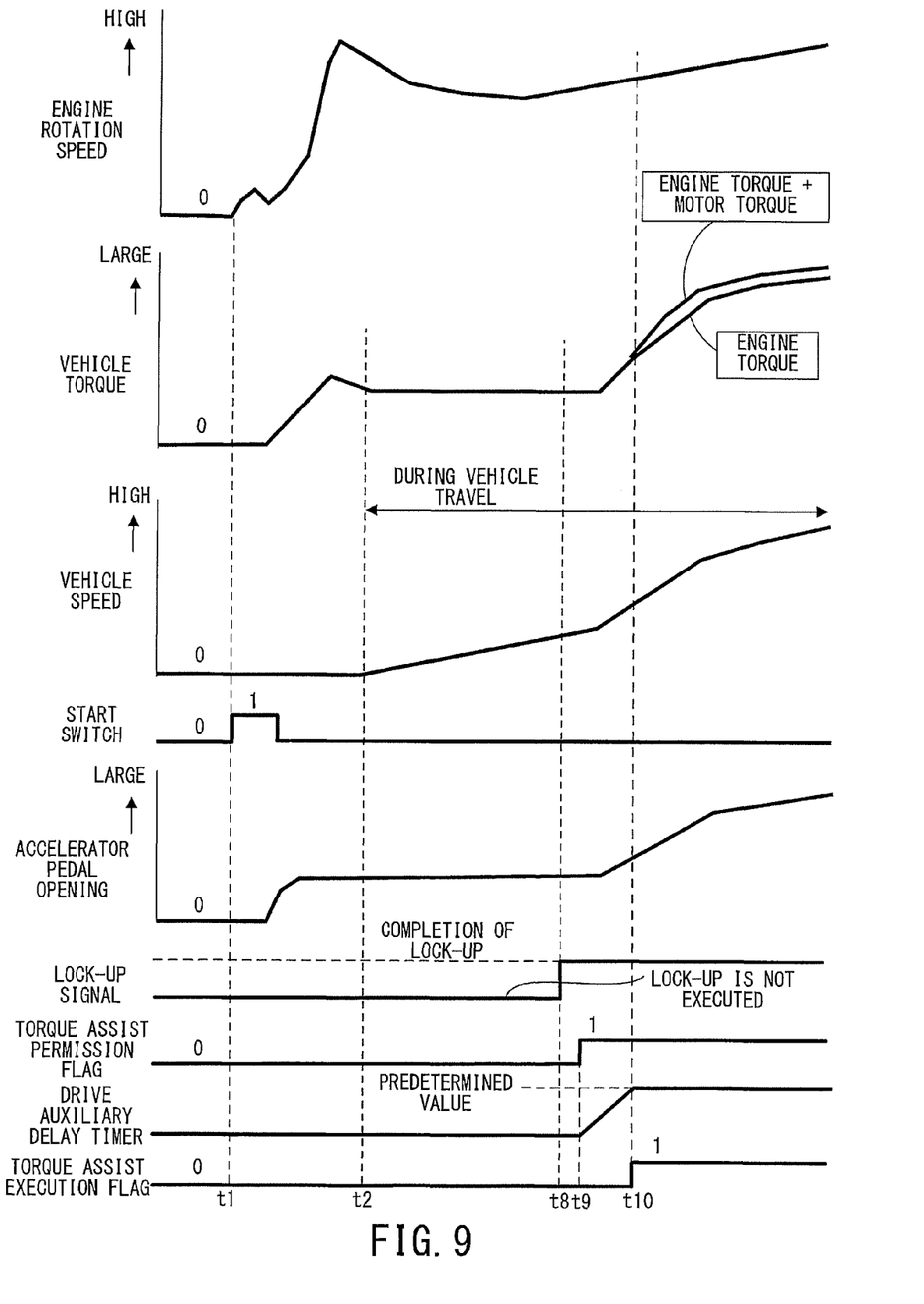
FIG. 9 is timing charts showing how an engine rotation speed, a vehicle torque, a vehicle speed and an accelerator pedal opening change from the start of an engine in a fourth embodiment by models.

FIG. 9 is timing charts showing how the engine rotation speed, the vehicle torque, the vehicle speed and the accelerator pedal opening change from the start of the engine in the fourth embodiment by models and corresponds to timing charts of FIG. 3.

When the torque assist permission condition is satisfied and the torque assist permission flag changes from 0 to 1 at timing t9 after the lock-up clutch 60 is engaged at timing t8, the count-up of the delay timer is started. A current from the main battery 41 is caused to flow into the inverter 24 and the motor generator 21 is caused to generate a motor torque at timing t10 at which the count value by the delay timer reaches a predetermined value or larger. In this way, the motor torque is added to an engine torque (torque assist) and acceleration desired by the driver is immediately obtained.

Figure 10:
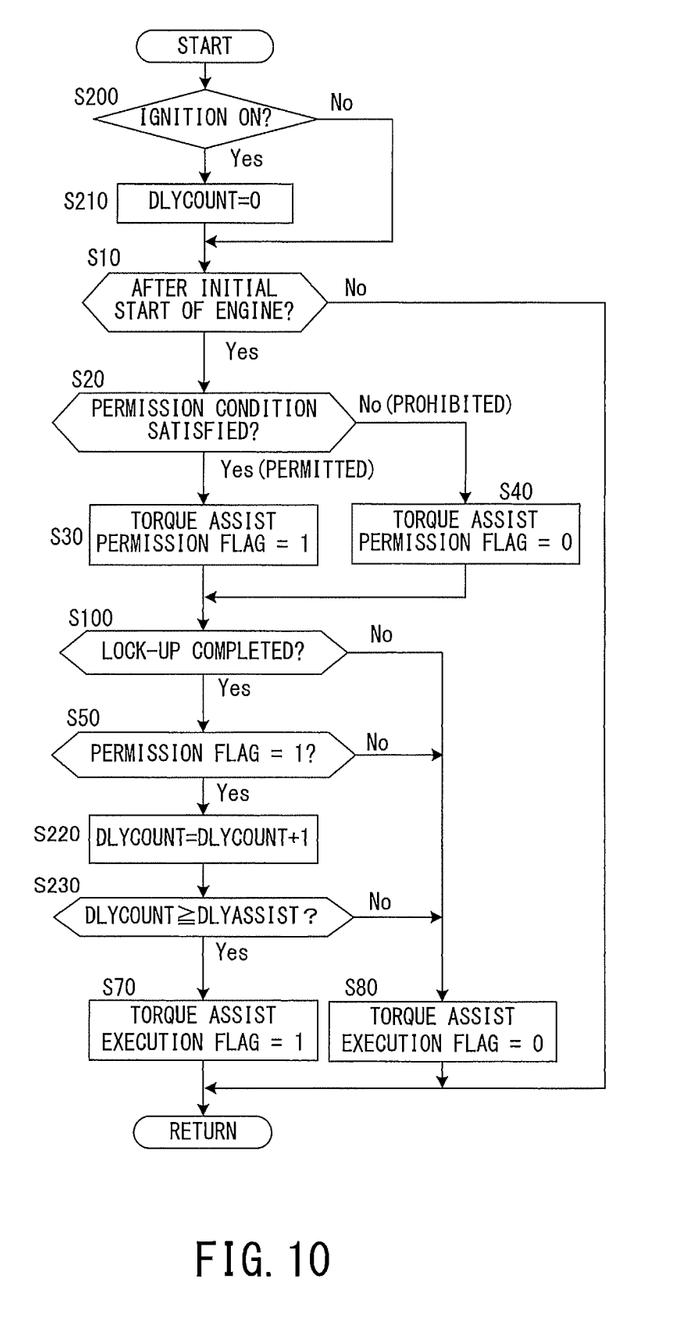
FIG. 10 is a flow chart of a torque assist control using a motor generator 21 executed by a vehicle drive device in the fourth embodiment.

FIG. 10 is a flow chart of a torque assist control using the motor generator 21 executed by the vehicle drive device in the fourth embodiment. Steps in which the same processing as that of the flow charts shown in FIGS. 4, 6 and 8 is performed are denoted by the same reference signals and not described in detail.

An advance is made to Step S100 after the processing of Step S30 or S40 is performed. An advance is made to Step S50 if it is determined in Step S100 that a signal indicating the completion of the lock-up is input, whereas an advance is made to Step S80 unless it is determined that the signal indicating the completion of the lock-up is input.

In Step S50, it is determined whether or not the torque assist permission flag is 1. An advance is made to Step S220 if the torque assist permission flag is determined to be 1, whereas an advance is made to Step S80 if the torque assist permission flag is determined to be 0. The processing after Step S220 is the same as in the flow chart shown in FIG. 8.

Also in the present embodiment, as in the third embodiment, an instruction to increase a CVT hydraulic pressure of the automatic transmission 9 is issued to increase the CVT hydraulic pressure in preparation for the execution of the torque assist using the motor generator 21 while the count value DLYCOUNT of the delay timer is determined to be below the predetermined value DLYASSIST.

As described above, according to the vehicle drive device in the fourth embodiment, the torque assist using the motor generator 21 is permitted after the elapse of the predetermined time after the torque assist permission condition is satisfied in the state where the lock-up clutch 60 is engaged. Since the torque assist is executed after the operating state and the CVT hydraulic pressure are reliably stabilized in preparation for the torque assist by the motor generator 21 in this way, facing burn of the lock-up clutch 60, a reduction in judder lift and belt slippage of the CVT (automatic transmission 9) at the time of the torque assist can be more reliably prevented.

The present invention is not limited to the embodiments described above. For example, the automatic transmission 9 may be a continuously variable transmission or a stepped transmission.

The present application claims a priority of Japanese Patent Application No. 2012-140454 filed with the Japan Patent Office on Jun. 22, 2012, all the contents of which are hereby incorporated by reference.

The invention claimed is:

1. A vehicle drive device, comprising:
a motor generator mechanically coupled to an output shaft of an engine via a belt;
a torque converter arranged between the engine and a transmission and including a lock-up clutch for connecting or disconnecting the engine and the transmission;
an engaged state detecting unit configured to detect an engaged state of the lock-up clutch;
a motor generator control unit configured to cause the motor generator to generate a predetermined assist torque to torque assist the engine; and
a torque assist permitting/prohibiting unit configured to prohibit a torque assist by the motor generator control unit when the lock-up clutch is released and permit the torque assist by the motor generator control unit if a condition for executing the torque assist is satisfied when the lock-up clutch is engaged.

2. The vehicle drive device according to claim 1, wherein:
the torque assist permitting/prohibiting unit is configured to prohibit the torque assist by the motor generator control unit during a lock-up transition when the lock-up clutch in a released state is engaged and permit the torque assist by the motor generator control unit when the lock-up clutch is engaged and the condition for executing the torque assist is satisfied.

3. The vehicle drive device according to claim 2, wherein:
the torque assist permitting/prohibiting unit is configured to permit the torque assist by the motor generator control unit at a time when a predetermined time has elapsed after the lock-up clutch is engaged under a state where the condition for executing the torque assist is satisfied.

4. The vehicle drive device according to claim 2, wherein:
the torque assist permitting/prohibiting unit is configured to permit the torque assist by the motor generator control unit at a time when a predetermined time has elapsed after the condition for executing the torque assist is satisfied under a state where the lock-up clutch is engaged.

5. A vehicle drive method for executing a torque assist of the engine using a motor generator mechanically coupled to an output shaft of an engine via a belt, comprising
detecting an engaged state of a lock-up clutch in a torque converter arranged between the engine and a transmission and including the lock-up clutch for connecting or disconnecting the engine and the transmission;
prohibiting the torque assist by the motor generator when the lock-up clutch is released and permitting the torque assist by the motor generator if a condition for executing the torque assist is satisfied when the lock-up clutch is engaged; and
causing the motor generator to generate a predetermined assist torque to torque assist the engine when the torque assist by the motor generator is permitted.

6. A vehicle drive device, comprising:
a motor generator mechanically coupled to an output shaft of an engine via a belt;
a torque converter arranged between the engine and a transmission and including a lock-up clutch for connecting or disconnecting the engine and the transmission;
engaged state detecting means for detecting an engaged state of the lock-up clutch;
motor generator control means for causing the motor generator to generate a predetermined assist torque to torque assist the engine; and
torque assist permitting/prohibiting means for prohibiting a torque assist by the motor generator control means when the lock-up clutch is released and permitting the torque assist by the motor generator control means if a condition for executing the torque assist is satisfied when the lock-up clutch is engaged.

* * * * *